United States Patent Office 3,032,181
Patented May 1, 1962

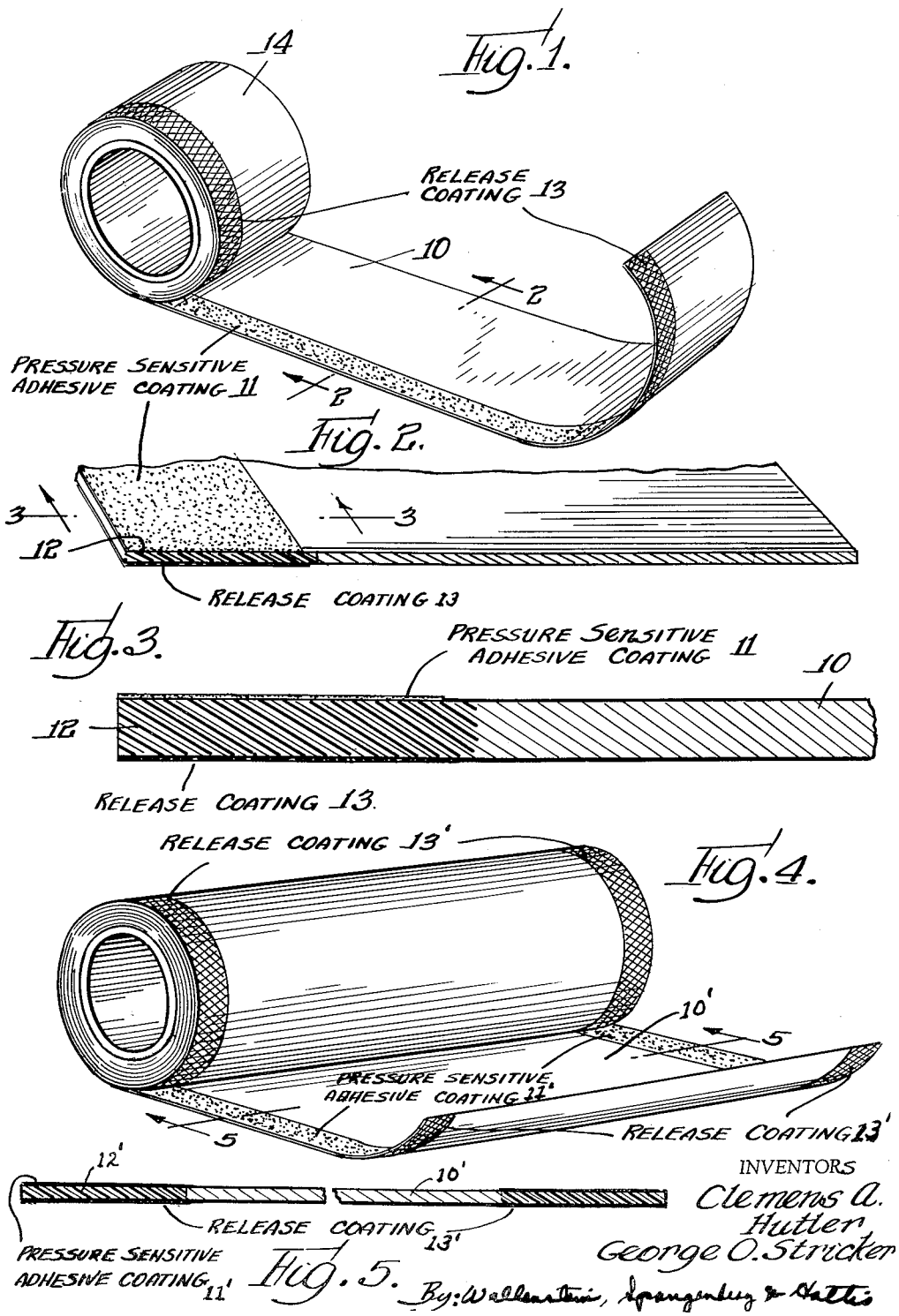

3,032,181
MASKING SHEET MATERIAL
Clemens A. Hutter, Elmhurst, and George O. Stricker, Blue Island, Ill., assignors to Daubert Chemical Company, Chicago, Ill., a corporation of Illinois
Filed June 14, 1961, Ser. No. 117,090
8 Claims. (Cl. 206—59)

This invention is directed to masking sheet material and is particularly concerned with a new and useful masking paper which is marketed in the form of rolls and which possesses the novel features of construction and the advantages disclosed hereafter in detail.

Masking paper, in the form of sheets or tapes, in the form of rolls and otherwise, has heretofore been disclosed in various patents and has been marketed with varying degrees of success. Illustrative of various U.S. patents disclosing such masking papers and tapes are Re. 18,742; 1,726,744; 1,895,978; 2,171,544; 2,201,877; 2,510,120; 2,657,795; 2,726,967; 2,808,358 and 2,964,438. The problems which are encountered in making a satisfactory masking paper or tape are discussed briefly in said last mentioned two patents, and the various proposals made in the art attest to the fact that the problem has received considerable attention. By way of example, one currently marketed masking paper is provided with a release material in contact with an adhesive coating, and it is necessary to effect removal of the release material prior to use of the masking paper. Such a paper is made by initially coating the adhesive onto the release paper, then cutting the resulting article into narrow strips, and then laminating said narrow strips to the paper. The aforesaid process is cumbersome and costly and, moreover, the resulting finished masking paper is relatively difficult to use. In any event, despite all such efforts and proposals, a fully satisfactory solution has not been provided to meet the problems of satisfactory functional properties and characteristics coupled with low cost of production and ease and simplicity of usage.

The present invention achieves the foregoing combination of advantages. In brief, the masking sheet material of the present invention, which is produced for commercial marketing in the form of a roll, comprises a plurality of convolutions of sheet material which, most advantageously, comprises kraft paper impregnated with a resinous or rubbery polymer, said sheet material having a layer of a pressure sensitive adhesive on only one side thereof and along either only one longitudinal edge thereof or, in another embodiment, along only the two opposite longitudinal edges thereof. The pressure sensitive adhesive, which should also desirably be one which will not stain painted or similar surfaces, is selected, from numerous of such commercially marketed adhesive compositions, so that, over and above its non-staining properties, it also desirably has a stronger bond to the resinous or rubbery polymer impregnated sheet material than to said unimpregnated sheet material. The width of the pressure sensitive adhesive layer, whether applied along only one longitudinal edge thereof or applied along only the opposite longitudinal edges thereof as indicated above, and the width of sheet material which carries the impregnation with the resinous or rubbery polymer is only a minor fraction of the width of the sheet material. Thus, for example, the width of the sheet material may be 6, 10, 12, 16, 20, 24, 28 or 36 inches, and the width of the pressure sensitive adhesive may be ⅜ to ⅝ of an inch, preferably ½ inch. The sheet material is provided with a release coating on the side opposite the side on which the pressure sensitive adhesive is carried but along the same longitudinal edge, or opposite longitudinal edges as the case may be, of the sheet material on which the pressure sensitive adhesive is carried. The width of the release coating is not less than the width of the layer of pressure sensitive adhesive but it is still only a minor fraction of the width of the sheet material. Advantageously, the width of the release coating is slightly greater than that of the pressure sensitive adhesive and, where sheets of the width referred to above are utilized, the width of the release coating may be ¾ of an inch to an inch. While the entire sheet may be impregnated with the resinous or rubbery polymer, it is particularly desirable to impregnate the sheet material only along the same longitudinal edge, or only along the opposite longitudinal edges, where the release coating and the pressure sensitive adhesive are carried and to a width no greater than the width of the release coating.

As has been stated above, the sheet material, most advantageously sulfite or kraft paper, which may be of various basis weight stock as, for instance, from 20 to 50 pounds and advantageously about 35 pounds, is most desirably impregnated, particularly in the aforementioned specified areas, with a resinous or rubbery polymer. While various resinous or rubbery polymers can effectively be utilized, it has been found especially advantageous to use rubber latex or synthetic rubber latices such as "neoprene" latices, and butadiene-styrene copolymer latices such as those containing in the range of 35 to 70% styrene. An illustrative example of the latter is the product commercially sold under the trade designation "Dow Latex 630" (The Dow Chemical Company) which is a butadiene-styrene copolymer containing 50% solids and 4.17 pounds of solids per gallon, said latex weighing 8.34 pounds per gallon. Other latices which can be used include, among others, known strong or concentrated aqueous dispersions of copolymers of butadiene with such mono-unsaturated compounds as isobutylene, methyl methacrylate, nitriles such as acrylic nitrile and alpha-methacrylic nitrile. The average particle size of the latex solids should advantageously be in the range of a fraction of a micron up to about 4 or 5 microns. In a typical or illustrative instance, using a latex of the character of "Dow Latex 630," it is preferably diluted with water to 30 to 35% solids and the kraft paper is then impregnated, as specified. Using, by way of example, a 35 pound basis weight kraft paper, excellent results have been obtained where the finished impregnated paper contained from 8 to 9 pounds of latex solids per ream of said kraft paper. This amount is variable and good results are obtained with latex impregnated kraft papers containing as low as about 5% and as high as about 70% of latex solids. The resinous or rubbery polymer impregnated papers have a number of advantages in the environment of the present invention including their relative freedom from tear characteristics.

Especially satisfactory masking papers made pursuant to the present invention have been made utilizing a kraft paper, such as one having from about 35 to 40 pounds basis weight, which has been coated or impregnated, advantageously only in the aforementioned selected areas, with fluorochemical grease and oil repellent materials such as "Scotchgard (FC-805)" (Minnesota Mining and Manufacturing Company). Such materials impart excellent hold-out or, in other words, non-water absorbent, properties with respect to the release coatings and the pressure sensitive adhesive coatings because, among other advantages, lower quantities of both of said latter coating materials can be employed thereby introducing definite economic savings. Other grease and oil repellent materials can be used in place of the fluorochemicals such as "Quilon" (E. I. du Pont de Nemours & Company) which is a chromium stearic acid complex usually marketed in the form of an alcoholic solution and whose active ingredient is represented by the formula

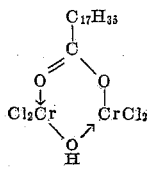

and "Aquapel" (Hercules Powder Company) which is generally marketed in certain grades, designated as Grade 364 and Grade 380 and which has a ketene dimer molecular structure having an apparent molecular weight of 530 and which is represented by the formula

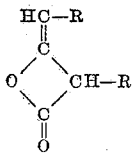

where R is alkyl, generally higher alkyl.

Referring, now, to the drawing, in which illustrative embodiments of the invention are shown, FIG. 1 is a perspective view showing a masking sheet or paper in the form of a roll;

FIG. 2 is a sectional view, taken along the line 2—2 of FIG. 1, in which the parts are shown in enlarged form for purposes of convenience and clarity;

FIG. 3 is a sectional view along the line 3—3 of FIG. 2, in which the parts are likewise shown in enlarged form;

FIG. 4 is a perspective view showing a modification of the masking tape of the present invention wherein adhesive is applied along the opposite longitudinal edges of the masking sheet; and FIG. 5 is a sectional view along the line 5—5 of FIG. 4, in which the parts are shown in enlarged form.

As shown, the masking tape comprises sheet stock 10, such as kraft paper, of suitable width and basis weight as described above. A strip or layer 11 of pressure sensitive adhesive is laid down along one longitudinal edge of the sheet stock 10. Underlying said strip or layer 11 and of at least the same and, better still, of a slightly greater width than the width of the strip or layer 11 is a resinous or rubbery polymer or grease and oil repellent area 12 (shown in FIGS. 2 and 3) in the form of an impregnation of or coating on the sheet stock 10. The latter impregnation or coating extends through and onto both sides of said sheet stock 10. On the opposite side of the sheet stock 10 and along the same longitudinal edge of said sheet stock as carries the pressure sensitive adhesive coating strip or layer 11 a release coating 13 is provided. The release coating, which may comprise any suitable silicone based material or other known release coating materials, is laid down in a width not less than and advantageously slightly greater than that of the pressure sensitive adhesive coating 11. As shown in FIG. 1, the sheet stock is wound in the form of a roll 14 comprising a series of convolutions of the above described coated and impregnated sheet stock.

In FIGS. 4 and 5 a different embodiment of the invention is shown in which the pressure sensitive adhesive is applied along opposite edges of the sheet 10'. Like elements are identified by the same numerals as in FIGS. 1, 2 and 3 except that they are accompanied by a prime (').

In use, the masking sheet material of the present invention may be employed in the same general way as heretofore known masking papers have been used. For best results, the surface to be protected should be reasonably smooth and free from dust or dirt before applying the masking sheet material. It can be applied to such surfaces as glass, floors, carpets, boats, furniture, woodwork, doors, automobiles, metals, and the like. The masking sheet material is cut, in any desired length, from the roll and applied with firm pressure along the adhesive edge. Where the masking sheet material is used to protect a surface in connection with a painting operation, said masking sheet material can readily and cleanly be removed or stripped off before the paint has dried. The masking sheet material generally should not be allowed to remain for substantial numbers of hours after use as, for instance, over night, since tackiness may build up. The use of the masking sheet material of the present invention easily effects straight line color separation, eliminates paint creeping, produces knife-sharp painted color lines, and avoids the necessity, common to various conventional masking papers, of aligning and combining separate rolls of paper and masking tape.

What we claim as new and desire to protect by Letters Patent of the United States is:

1. A unitary masking sheet in the form of a roll, wherein an unrolled severed section of the unitary masking sheet is removably securable only along one of its edges to a variety of surfaces for masking said surfaces during a painting or analogous operation, comprising a plurality of convolutions of an elongated sheet of flexible masking material, a layer of pressure sensitive adhesive applied to said sheet on only one side thereof and along only one longitudinal edge thereof, said pressure sensitive adhesive layer being adherable to said sheet and readily removably adherable to said surfaces to be masked and the width of said pressure sensitive adhesive layer being a minor fraction of the width of said sheet, and a release coating applied to said sheet on the opposite side thereof and along the same longitudinal edge thereof to prevent the pressure sensitive adhesive layer on the plurality of convolutions of the rolled sheet from adhering thereto, the width of said release coating being not less than the width of said pressure sensitive adhesive layer.

2. A unitary masking sheet in the form of a roll, wherein an unrolled severed section of the unitary masking sheet is removably securable only along its opposite edges to a variety of surfaces for masking said surfaces during a painting or analogous operation, comprising a plurality of convolutions of an elongated sheet of flexible masking material, a layer of pressure sensitive adhesive applied to said sheet on only one side thereof and along only the opposite longitudinal edges thereof, said pressure sensitive adhesive layers being adherable to said sheet and readily removably adherable to said surfaces to be masked and the width of each of said pressure sensitive adhesive layers along the opposite longitudinal edges of said sheet being a minor fraction of the width of said sheet, and a release coating applied to said sheet on the opposite side thereof and along the same opposite longitudinal edges thereof to prevent the pressure sensitive adhesive layers on the plurality of convolutions of the rolled sheet from adhering thereto, the width of said release coating encompassing at least the total of the widths of said pressure sensitive adhesive layers but still being a minor fraction of the width of said sheet.

3. A unitary masking sheet, removably securable only along at least one of its opposite edges to a variety of surfaces for masking said surfaces during a painting or analogous operation, comprising an elongated single sheet of flexible masking material, a layer of pressure sensitive adhesive applied to said sheet on only one side thereof and only along at least one of the opposite longitudinal edges thereof, said pressure sensitive adhesive layer being adherable to said sheet and readily removably adherable to said surfaces to be masked and the width of said pressure sensitive adhesive layer along said at least one of the opposite longitudinal edges of said sheet being a minor fraction of the width of said sheet, and a release coating applied to said sheet on the opposite side thereof and along the same of said at least one of the opposite longitudinal edges of said sheet to prevent superimposed layers of said pressure sensitive adhesive from adhering thereto, the width of said release coating encompassing at least the width of said pressure sensitive adhesive layer along said at least one of the opposite longitudinal edges of said sheet but still a minor fraction of the width of said sheet.

4. A unitary masking sheet, removably securable only along at least one of its opposite edges to a variety of surfaces for masking said surfaces during a painting or analogous operation, comprising an elongated single sheet of masking paper, a layer of pressure sensitive adhesive applied to said paper sheet on only one side thereof and only along at least one of the opposite longitudinal edges thereof, said pressure sensitive adhesive layer being adherable to said paper sheet and readily removably adherable to said surfaces to be masked and the width of said pressure sensitive adhesive layer along said at least one of the opposite longitudinal edges of said paper sheet being a minor fraction of the width of said paper sheet, said paper sheet being impregnated along the same of said at least one of the opposite longitudinal edges of said paper sheet with a resinous or rubbery polymer for strengthening said paper sheet, the width of the impregnated area of said paper sheet bieng not less than the width of said pressure sensitive adhesive layer, and a release coating applied to said paper sheet on the opposite side thereof and along the same of said at least one of the opposite longitudinal edges of said paper sheet to prevent superimposed layers of said pressure sensitive adhesive from adhering thereto, the width of said release coating encompassing at least the width of said pressure sensitive adhesive layer along said at least one of the opposite longitudinal edges of said paper sheet.

5. A unitary masking sheet, removably securable only along at least one of its opposite edges to a variety of surfaces for masking said surfaces during a painting or analogous operation, comprising an elongated single sheet of masking paper, a layer of pressure sensitive adhesive applied to said paper sheet on only one side thereof and only along at least one of the opposite longitudinal edges thereof, said pressure sensitive adhesive layer being adherable to said paper sheet and readily removably adherable to said surfaces to be masked and the width of said pressure sensitive adhesive layer along said at least one of the opposite longitudinal edges of said paper sheet being a minor fraction of the width of said paper sheet, said paper sheet being impregnated along the same of said at least one of the opposite longitudinal edges of said paper sheet with a resinous or rubbery polymer for strengthening said paper sheet, the width of the impregnated area of said paper sheet being not less than the width of said pressure sensitive adhesive layer but still a minor fraction of the width of said paper sheet, and a release coating applied to said paper sheet on the opposite side thereof and along the same of said at least one of the opposite longitudinal edges of said paper sheet to prevent superimposed layers of said pressure sensitive adhesive from adhering thereto, the width of said release coating encompassing at least the width of said pressure sensitive adhesive layer along said at least one of the opposite longitudinal edges of said paper sheet.

6. A unitary masking sheet, removably securable only along at least one of its opposite edges to a variety of surfaces for masking said surfaces during a painting or analogous operation, comprising an elongated single sheet of kraft masking paper, a layer of pressure sensitive adhesive applied to said paper sheet on only one side thereof and only along at least one of the opposite longitudinal edges thereof, said pressure sensitive adhesive layer being adherable to said paper sheet and readily removably adherable to said surfaces to be masked and the width of said pressure sensitive adhesive layer along said at least one of the opposite longitudinal edges of said paper sheet being a minor fraction of the width of said paper sheet, said paper sheet being impregnated along the same of said at least one of the opposite longitudinal edges with a latex for strengthening said paper sheet, said paper sheet containing from 8 to 9 pounds of latex solids per ream, the width of the impregnated area of said paper sheet being not less than the width of said pressure sensitive adhesive layer, and a release coating applied to said paper sheet on the opposite side thereof and along the same of said at least one of the opposite longitudinal edges of said paper sheet to prevent superimposed layers of said pressure sensitive adhesive from adhering thereto, the width of said release coating encompassing at least the width of said pressure sensitive adhesive layer along said at least one of the opposite longitudinal edges of said paper sheet.

7. A unitary masking sheet, removably securable only along one of its edges to a variety of surfaces for masking said surfaces during a painting or analogous operation, comprising an elongated single sheet of flexible masking paper, a layer of pressure sensitive adhesive applied to said paper sheet on only one side thereof and along only one longitudinal edge thereof, said pressure sensitive adhesive layer being adherable to said paper sheet and readily removably adherable to said surfaces to be masked and the width of said pressure sensitive adhesive layer being a minor fraction of the width of said paper sheet, said paper sheet being impregnated along said longitudinal edge thereof with a resinous or rubbery polymer for strengthening said paper sheet, the width of said impregnated area of said paper sheet being not less than the width of said pressure sensitive adhesive layer but still a minor fraction of the width of said paper sheet, and a release coating applied to said paper sheet on the opposite side thereof and along the same longitudinal edge thereof to prevent a superimposed layer of said pressure sensitive adhesive from adhering thereto, the width of said release coating being not less than the width of said pressure sensitive adhesive layer but still a minor fraction of the width of said paper sheet.

8. A unitary masking sheet, removably securable only along its opposite edges to a variety of surfaces for masking said surfaces during a painting or analogous operation, comprising an elongated single sheet of flexible masking paper, a layer of pressure sensitive adhesive applied to said paper sheet on only one side thereof and along only the opposite longitudinal edges thereof, said pressure sensitive adhesive layers being adherable to said paper sheet and readily removably adherable to said surfaces to be masked and the width of each of said pressure sensitive adhesive layers along the opposite longitudinal edges of said paper sheet being a minor fraction of the width of said sheet, said paper sheet being impregnated along said opposite longitudinal edges thereof with a resinous or rubbery polymer for strengthening said paper sheet, the width of said impregnated areas of said paper sheet being not less than the width of said pressure sensitive adhesive layers but still a minor fraction of the width of said paper sheet, and a releast coating applied to said paper sheet on the opposite side thereof and along the same opposite longitudinal edges thereof to prevent superimposed layers of said pressure sensitive adhesive from adhering thereto, the width of said release coating encompassing at least the total widths of said pressure sensitive adhesive layers but still being a minor fraction of the width of said paper sheet.

References Cited in the file of this patent
UNITED STATES PATENTS

| | | |
|---|---|---|
| 732,889 | Paver | July 7, 1903 |
| 1,630,597 | Banff | May 31, 1927 |
| 1,682,639 | Templeman | Aug. 28, 1928 |
| 1,987,545 | Alexander | Jan. 8, 1935 |
| 2,173,989 | Wilbur | Sept. 26, 1939 |
| 2,185,470 | MacDonald et al. | Jan. 2, 1940 |
| 2,565,509 | Marcin | Aug. 28, 1951 |
| 2,954,868 | Swedish | Oct. 4, 1960 |
| 2,961,348 | Finnegan et al. | Nov. 22, 1960 |